Patented Dec. 11, 1928.

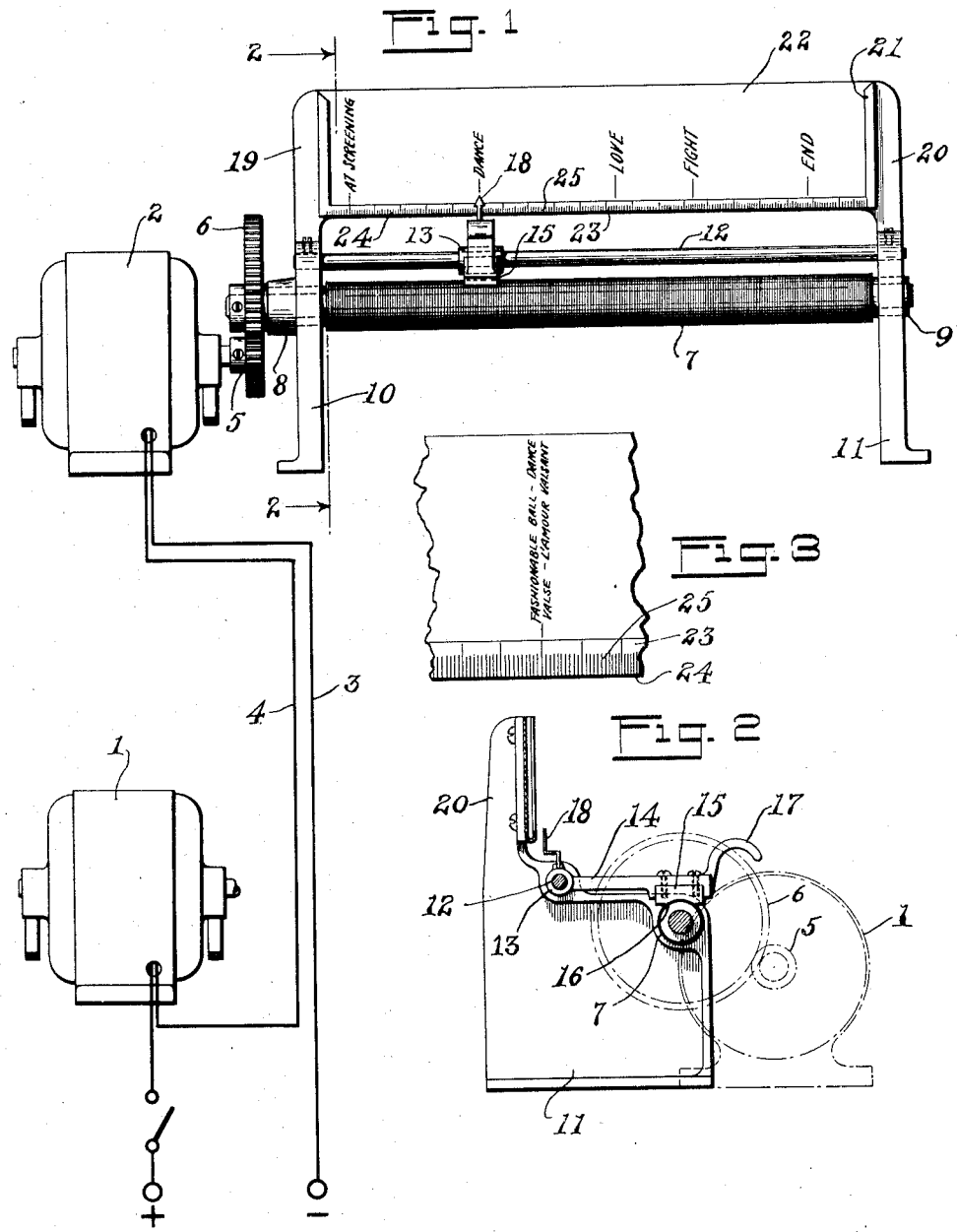

1,694,942

UNITED STATES PATENT OFFICE.

MICHAEL HOFFMAN, OF BROOKLYN, NEW YORK.

INDICATOR FOR MOTION-PICTURE-PROJECTION APPARATUS.

Application filed March 30, 1927. Serial No. 179,522.

This invention relates to the art of motion pictures, and one of the objects thereof is to provide new and improved means, whereby musical scores produced to accompany a screened play or performance or various scenes, may be more accurately co-related or co-ordinated to the projected acts or scenes or parts of a play or performance.

Another object of the invention is to provide new and improved means of the above character, whereby the work to be performed by an orchestra leader or by a musician in producing or playing a musical score in conjunction with a motion picture performance, is greatly minimized, and whereby the musical score or numbers played, may be caused to more exactly coincide with the features of the screen performance or acts and scenes thereof.

Other objects and aims of the invention, more or less specific than those referred to above, will be in part obvious, and in part pointed out in the course of the following description of the elements, combinations, arrangements of parts and applications of principles, constituting the invention, and the scope of protection contemplated will be indicated in the appended claims.

In the accompanying drawings, wherein I have indicated, partly schematically a preferred form of embodiment of my invention, Figure 1 is an elevational view illustrating my invention;

Figure 2 is a sectional view through a portion of the apparatus, said view being taken on line 2—2 of Figure 1, looking in the direction of the arrows; and Figure 3 is an elevational view partly broken away, showing a detail of construction.

Before proceeding to describe the structural characteristics of the embodiment of my invention illustrated herein, it may here be noted that the method or procedure of co-relating or co-ordinating the musical score to the actions or scenes projected upon the screen hitherto most commonly practiced, has been through the use of what is known as a "cue" sheet. This sheet has been formulated by a skilled musician or musical director, by observing a preliminary screening of the film thereafter to be projected to accompanying music. This skilled observer notes the various titles and acts or scenes projected on the screen, and thereafter arranges a suitable muscial score, co-relates the numbers of said score to the various titles, acts or scenes, noting also the time required for the projection of the various acts or scenes and thereafter, having this data at hand, constructs or arranges the "cue" sheet for the musical score of the picture thereafter to be exhibited. These cue sheets are thereafter printed and distributed with the films to the various theatres in conjunction with the films to be screened, and are used by the orchestra leader or musician, such for instance as an organist or pianist in producing or providing the music for the screened picture, and as a guide in coordinating the musical program with the titles, acts or scenes of the projected picture.

The above method of co-ordinating the musical score to a projected picture, has several defects. Among them are the necessity for the musical conductor or musician to almost constantly watch the screen, keep track of the time consumed in the production of the various acts or scenes, whereby the musical numbers may be properly and accurately co-ordinated therewith, watch the cue sheet and at the same time conduct the orchestra or produce the music as in the case of a musician who is required to play the score; the difficulty that arises when the operator of the projecting machine has cut footage from the film to remove defective portions thereof or when portions of the film have been cut out under requirements of censorship, thereby disorganizing the initial relationship between the cue sheet and the film from which said cue sheet was produced. Moreover, the cutting away of footage from the film often includes titles printed on the cue sheet, thereby causing the conductor or muscian to lose the cue and sometimes titles are changed by inserting portions into the film, thereby changing the predetermined arrangement between the film and the cue sheet.

In curing the above enumerated, among other objections, I have provided an indicator operable in a position convenient to the observation of the conductor or musician, said indicator being so connected with the projecting machine that it will at all times enable the conductor or musician to co-ordinate the musical score to the screened picture, relieving said conductor or musician of the necessity of simultaneously performing the above indicated operations, and whereby the co-ordinance of the musical score to the projected picture is greatly enhanced.

In accomplishing the above, among other objects of the invention in the apparatus which I shall now proceed to describe and wherein similar reference characters refer to similar parts throughout the several views thereof, referring now to the drawings, the reference numeral 1 denotes a motor intended to be located in the booth occupied by the operator of the projecting machine (not shown). This motor is adapted to operate the projecting machine at a speed adapted properly to project the pictures portrayed upon the screen. The reference numeral 2 denotes another motor. This motor is preferably located at a position remote from the motor 1, preferably at a position in proximity to the stage of the theatre or the screen upon which the pictures are to be projected. Motors 1 and 2 are intended to be synchronized, so that they will operate in unison, and thereby perform the functions hereinafter to be described. Inasmuch as the method of synchronizing such motors is well known in the electrical art, it is not deemed necessary to describe nor illustrate such construction in this application. Moreover, in the event that the projecting machine is hand driven, rather than by a motor, such as illustrated at 1, synchronizing means will be provided in the hand operated device, whereby the motor 2 will be driven at a determined speed relative to the speed of projection of the pictures of the film.

In the present instance, the motors 1 and 2 are shown as being connected in series with a circuit having the lead wires 3 and 4 deriving their power through said leads from a suitable source of supply (not shown).

The motor 2 is adapted through the gears 5 and 6 to drive the threaded cylinder or shaft 7, said shaft being preferably mounted in bearings 8 and 9 provided in the standards 10 and 11.

The reference numeral 12 denotes a rod supported at its outer ends in said standards, said rod forming a support for a bracket 13 which is adapted to ride or slide on this rod. The bracket 13 is provided with a forwardly extending arm 14 which has mounted thereon a block 15, the latter being provided with a threaded face 16, the threads of which are adapted to engage with the threads of the shaft or cylinder 7. The block 15 which rests upon the threaded face 16 through gravity, may be lifted therefrom as by means of the handle 17 provided upon the arm 14, whereupon the bracket 13 is free to slide upon the rod 12, which operation may be accomplished through the instrumentality of the handle 17. It will be noted that when the cylinder shaft 7 is rotated by the above described means, the bracket 13 will be caused to move or slide lengthwise on the rod 12 by reason of the threaded engagement of the block 15 with the threads of the shaft or cylinder 7. The bracket 13 is provided with an indicator 18.

Erected upon the standards 10 and 11 are the arms 19 and 20 which form a support for a frame 21, said frame being adapted to carry a cue chart 22. It is intended that this cue chart shall fit with such nicety in the frame 21, that notations printed or made upon said chart, will maintain a predetermined relation with the indicator 18 of the bracket 13.

Provided upon the face 23 of the horizontally disposed member 24 of the frame 21 is a scale 25 with which the indicator 18 is also adapted to co-operate. The spaces defined by the lines of this scale, bear a predetermined relation to the footage of the film, as does also the pitch of the threads on the shaft or cylinder 7, whereby the indicator member 18 will be caused to move on its support a predetermined distance for each determined increment of film projected upon the screen. This is accomplished through the synchronization of the motors 1 and 2 as above described, that is to say, the movement of a predetermined length of film past the lens of the projecting apparatus, causes a predetermined movement of the indicator 18 over the scale 25 and the chart 22.

The chart 22 is prepared in a manner somewhat similar to the manner of preparing the cue sheet above described, that is to say, a skilled observer of a preliminary screening or pre-view of a film, notes on the then blank chart the various features which in accordance with the practice hitherto pursued, have been noted on a blank sheet. These notes are made on the chart at positions opposite the indicator 18 as the latter is moved along the chart by the means above described.

Having made these notations, the finished chart is then prepared and printed, the final notations thereon maintaining the same relative position as regards the movable indicator as did the initial notations made by the observer.

It will be understood, of course, that finished charts are cut to the exact relative size of the chart utilized in the pre-view, so that when said finished charts are inserted in the frame of another similarly constructed machine, the notations thereon will enable the indicator to function as above described. The finished printed cue charts are thereafter distributed with the films to the various theatres wherein the film for which the chart has been prepared, is to be shown.

It will be seen that in the use of this apparatus, it is merely necessary for the conductor or musician to insert the chart in the frame of the machine and that thereafter during the projection of the picture upon the screen, the indicator 18 will show the musician at what points during the screening of the picture, the musical score is to be changed and will also indicate to said conductor or musician, the character of the music to be produced, as well as the title thereof, for each scene or act portrayed. Should a portion of the film have been cut out, the operator of the projecting machine has merely to notify the conductor or musician of the footage of said film so cut away, whereupon the conductor or musician may at the proper instant disengage the threaded block from the shaft or cylinder 7 and move the indicator longitudinally a distance proportionate to the footage cut out of the film, whereupon the indicator will thereafter continue to perform its functions.

It will accordingly be seen that I have provided an apparatus well adapted, to attain among others, all the ends and objects above pointed out in a most efficient manner. The necessity of watching the screen, a cue sheet, keeping track of the time for each respective scene or act, is eliminated and the conductor or musician has merely to follow the practice of the indicator along the chart. The labor of the conductor or musician as regards properly co-ordinating the music to the screened production is, therefore, greatly minimized, and a more accurate co-ordination between the screened picture and musical score obtained.

As many changes could be made in this construction without departing from the scope of the following claims, it is intended that all matter contained in the above description, or shown in the accompanying drawing, shall be interpreted as illustrative only and not in a limiting sense.

Having thus described my invention, what I claim as new and desire to secure by Letters Patent, is:—

1. In apparatus of the class described, in combination, means for visually indicating features of a film being moved past the lens of a projecting apparatus, comprising a chart having characters indicative of illustrative or descriptive features of the film being screened, and an indicator for operating with said chart, means for synchronously operating said indicating means with projecting apparatus so that said indicating means will give a visual indication of the part of the film being screened and means for independently adjusting the indicating means, with respect to the features of the film being screened.

2. In apparatus of the class described, in combination, means for visually indicating pictorial features of a film being moved past the lens of a projecting apparatus, comprising a chart having characters indicative of illustrative or descriptive features of the film being screened, and an indicator cooperating with said chart so that said indicating means will give a visual indication of the part of the film being screened, means for operating said indicating means synchronously with projecting apparatus for the film, and means for varying the indicating relation between the indicating means and the projected pictures.

3. In apparatus of the class described, in combination, a motor adapted to drive projecting apparatus, a second motor driven synchronously with said first named motor, an indicating device driven by said second motor including a cue chart having characters indicative of the pictorial features of the film, and a movable indicator cooperating with said chart providing a visual indication of the corresponding pictorial features of the film as the same moves past the lens of the projecting apparatus, and means for varying the indicating relation between the indicating means and the projected pictures.

4. In apparatus of the class described, in combination a motor adapted to drive projecting apparatus, a second motor driven synchronously with the said first named motor, an indicating device operated by said second motor including a cue chart having indicating characters correlated to the features of a film, and a movable indicator co-operating with said chart and adapted to give a visual indication of said features of the film being screened as said film moves past the lens of said projecting apparatus, and means whereby the relation between said indicator and the features of the film being projected may be varied.

5. In apparatus of the class described, in combination, means for giving a visual indication of the progress of the film of a motion picture projecting machine comprising a device located adjacent the screen upon which the motion pictures are to be projected and synchronously operated with the projecting apparatus comprising an indicator, means for supporting said indicator, a cue chart having characters indicative of the features of the film, said operating means moving said indicator progressively along said cue chart, and means for varying the relation between the indicator and the pictures being projected from the film.

6. In apparatus of the class described, means for giving a visual indication of the progress of the film of a motion picture projecting machine past the lens thereof, comprising a device synchronously operated with the projecting apparatus located adjacent the screen upon which the motion pictures are to be projected and having an indicator, means for supporting said indicator, a cue chart having characters indicative of the pictorial features of the film, said indicator being moved progressively along said cue chart, and means for manually changing the relative position between the indicator and the pictures being projected upon the screen.

7. In apparatus of the class described, in combination, a device for motion picture projection for indicating the portion of the film moved past the lens of a projecting apparatus comprising a cue chart provided with indicia cooperatively related with the features of the film to be projected upon a screen, an indicator movable along said cue chart, a support upon which said indicator is slidably mounted, a screw threaded shaft upon which said indicator is mounted for moving the latter and with which it is detachably engaged, means for synchronously driving said shaft and the projecting apparatus such that the indicator is moved relatively to said chart so that said indicating means will give a synchronous visual indication of the part of the film being screened, and means whereby the relative relation between the indicator and the pictures being projected may be varied at will.

8. In apparatus of the class described, in combination, an indicating device for use in motion picture projection for indicating the portion of a film being moved past the lens of a moving picture projecting apparatus comprising a cue chart provided with indicia relating to features of a film to be projected upon a screen by said projecting apparatus, an indicator adapted to be moved along said cue chart, a support upon which said indicator is slidably mounted, a screw threaded shaft with which said indicator is detachably engaged for moving the latter, means for synchronously driving said shaft and said projecting apparatus such that indicator is moved relatively to the chart synchronously with the passage of the film past the lens of the projecting apparatus, and means whereby said indicator may be disengaged from said shaft thereby permitting it to be manually moved with relation to said cue chart thereby to vary its relation with the pictorial features of the film being projected upon the screen.

In testimony whereof, I hereunto affix my signature.

MICHAEL HOFFMAN.